US009726010B2

(12) United States Patent
Wassermann et al.

(10) Patent No.: US 9,726,010 B2
(45) Date of Patent: Aug. 8, 2017

(54) ESTIMATION OF MULTICHANNEL MUD CHARACTERISTICS

(75) Inventors: Ingolf Wassermann, Hannover (DE); Hanno Reckmann, Nienhagen (DE); Michael Neubert, Lower Saxony (DE)

(73) Assignee: BAKER HUGHES INCORPORATED, Houston, TX (US)

( * ) Notice: Subject to any disclaimer, the term of this patent is extended or adjusted under 35 U.S.C. 154(b) by 1182 days.

(21) Appl. No.: 12/170,845

(22) Filed: Jul. 10, 2008

(65) Prior Publication Data

US 2009/0016160 A1 Jan. 15, 2009

Related U.S. Application Data

(60) Provisional application No. 60/949,684, filed on Jul. 13, 2007.

(51) Int. Cl.
*E21B 47/18* (2012.01)
*G01V 11/00* (2006.01)

(52) U.S. Cl.
CPC ............ *E21B 47/18* (2013.01); *G01V 11/002* (2013.01)

(58) Field of Classification Search
CPC ..... E21B 47/18; E21B 47/187; G01V 11/002; H04L 25/0204; H04L 25/0242
USPC ............................ 367/83; 702/189, 190, 196
See application file for complete search history.

(56) References Cited

U.S. PATENT DOCUMENTS

| | | | |
|---|---|---|---|
| 3,742,443 A * | 6/1973 | Foster et al. ................. 367/83 |
| 5,055,837 A * | 10/1991 | Abdallah et al. ............. 367/83 |
| 5,113,379 A | 5/1992 | Scherbatskoy |
| 5,917,919 A * | 6/1999 | Rosenthal .................. 381/71.11 |
| 5,969,638 A | 10/1999 | Chin |
| 6,487,524 B1 * | 11/2002 | Preuss ........................ 702/196 |
| 6,626,253 B2 | 9/2003 | Hahn et al. |
| RE38,567 E | 8/2004 | Gruenhagen |
| 6,837,332 B1 * | 1/2005 | Rodney ....................... 181/105 |
| 7,313,052 B2 * | 12/2007 | Fincher et al. .............. 367/83 |
| 7,324,010 B2 * | 1/2008 | Gardner et al. ........... 340/854.4 |

(Continued)

FOREIGN PATENT DOCUMENTS

GB 2361789 A * 10/2001 ............. E21B 47/18
WO 2007149324 A2 12/2007

OTHER PUBLICATIONS

Wang, W. et al., "Blind separation of convolutive mixtures of cyclostationary sources using an extended natural gradient method," Signal Processing and Its Applications, 2003 Proceedings, 7th Intern'l Symposium, New Jersey, Int. J. Adapt. Control Signal Process, (2004).

(Continued)

*Primary Examiner* — Kipp Wallace
(74) *Attorney, Agent, or Firm* — Mossman, Kumar & Tyler, PC

(57) ABSTRACT

The disclosure is directed to method and apparatus for communication through a fluid. The method includes measuring signals in the fluid at at least two spaced apart positions; estimating a subset of a separation matrix; and using the estimated subset and the signals to estimate a signal sent by the message source. The apparatus may include a message source on a bottom hole assembly; sensors disposed at least two spaced apart locations; and at least one processor configured to: estimate a subset of a separation matrix based on the signals and use the subset to estimate a message signal set by the message source.

17 Claims, 5 Drawing Sheets

(56) References Cited

U.S. PATENT DOCUMENTS

| | | | |
|---|---|---|---|
| 7,409,016 B2* | 8/2008 | Kim et al. | 375/340 |
| 7,502,312 B2* | 3/2009 | Zhang et al. | 370/210 |
| 2002/0180613 A1 | 12/2002 | Shi et al. | |
| 2004/0069514 A1* | 4/2004 | Rodney et al. | 174/35 R |
| 2004/0144565 A1* | 7/2004 | Koederitz | 175/25 |
| 2006/0132327 A1 | 6/2006 | Reckmann et al. | |
| 2006/0132328 A1 | 6/2006 | Reckmann et al. | |
| 2006/0227005 A1* | 10/2006 | Fincher et al. | 340/855.4 |
| 2007/0132606 A1 | 6/2007 | Reckmann et al. | |
| 2007/0209865 A1* | 9/2007 | Kokosalakis et al. | 181/0.5 |
| 2008/0002524 A1 | 1/2008 | Wassermann et al. | |
| 2008/0074948 A1* | 3/2008 | Reckmann | 367/81 |

OTHER PUBLICATIONS

Abed-Meraim, K. et al., "Separation of Convolutive Mixtures" in: Boashash, B. Time Frequency Signal Analysis and Process: A Comprehensive Reference, Elsevier, pp. 323-333 (2003).

* cited by examiner

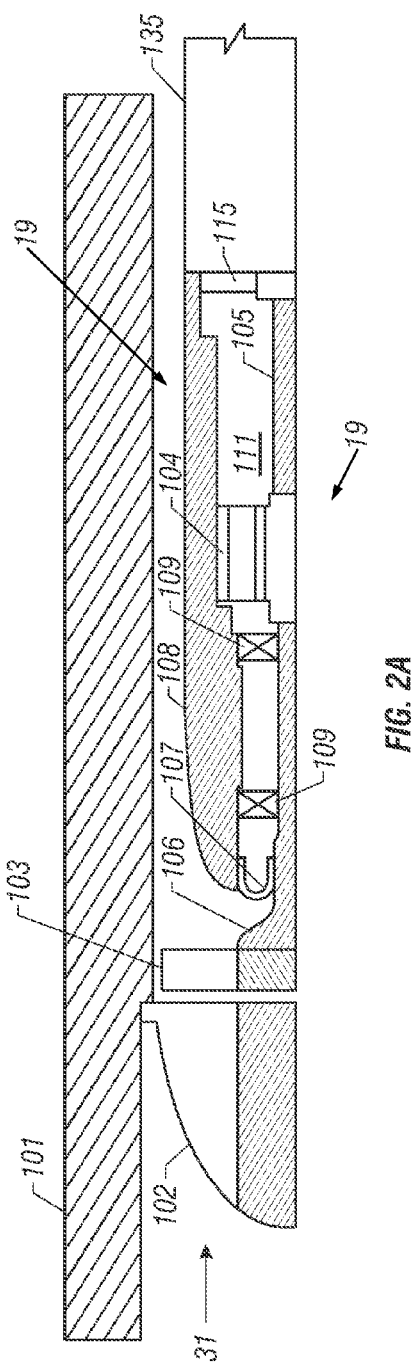
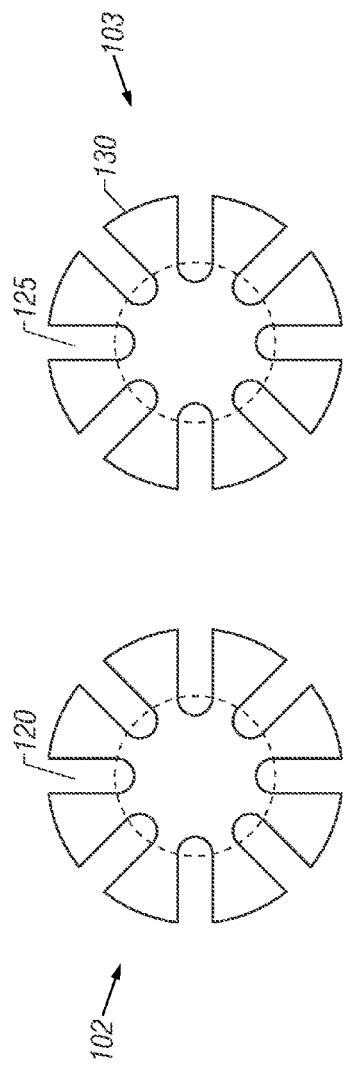
FIG. 2A
FIG. 2B
FIG. 2C

ESTIMATION OF MULTICHANNEL MUD CHARACTERISTICS

CROSS-REFERENCES TO RELATED APPLICATIONS

This application claims priority from U.S. Provisional patent application Ser. No. 60/949,684 filed on 13 Jul. 2007.

BACKGROUND OF THE DISCLOSURE

1. Field of the Disclosure

The present disclosure relates to telemetry systems for communicating information from a downhole location to a surface location and, more particularly, to a method of removing noise at the surface location produced by surface sources.

2. Description of the Related Art

Drilling fluid telemetry systems, generally referred to as mud pulse systems, are particularly adapted for telemetry of information from the bottom of a borehole to the surface of the earth during oil well drilling operations. The information telemetered often includes, but is not limited to, parameters of pressure, temperature, direction and deviation of the well bore. Other parameter include logging data such as resistivity of the various layers, sonic density, porosity, induction, self potential and pressure gradients. This information is critical to efficiency in the drilling operation.

MWD Telemetry is required to link the downhole MWD components to the surface MWD components in real-time, and to handle most drilling related operations without breaking stride. The system to support this is quite complex, with both downhole and surface components that operate in step.

In any telemetry system there is a transmitter and a receiver. In MWD Telemetry the transmitter and receiver technologies are often different if information is being up-linked or down-linked. In up-linking, the transmitter is commonly referred to as the Mud-Pulser (or more simply the Pulser) and is an MWD tool in the BHA that can generate pressure fluctuations in the mud stream. The surface receiver system consists of sensors that measure the pressure fluctuations and/or flow fluctuations, and signal processing modules that interpret these measurements.

Down-linking is achieved by either periodically varying the flow-rate of the mud in the system or by periodically varying the rotation rate of the drillstring. In the first case, the flow rate is controlled using a bypass-actuator and controller, and the signal is received in the downhole MWD system using a sensor that is affected by either flow or pressure. In the second case, the surface rotary speed is controlled manually, and the signal is received using a sensor that is affected.

For uplink telemetry, a suitable pulser is described in U.S. Pat. No. 6,626,253 to Hahn et al., having the same assignee as the present application and the contents of which are fully incorporated herein by reference. Described in Hahn '253 is an anti-plugging oscillating shear valve system for generating pressure fluctuations in a flowing drilling fluid. The system includes a stationary stator and an oscillating rotor, both with axial flow passages. The rotor oscillates in close proximity to the stator, at least partially blocking the flow through the stator and generating oscillating pressure pulses. The rotor passes through two zero speed positions during each cycle, facilitating rapid changes in signal phase, frequency, and/or amplitude facilitating enhanced data encoding.

U.S. RE38,567 to Gruenhagen et al., having the same assignee as the present disclosure and the contents of which are fully incorporated herein by reference, and U.S. Pat. No. 5,113,379 to Scherbatskoy teach methods of downlink telemetry in which flow rate is controlled using a bypass-actuator and controller.

Drilling systems (described below) include mud pumps for conveying drilling fluid into the drillstring and the borehole. Pressure waves from surface mud pumps produce considerable amounts of noise. The pump noise is the result of the motion of the mud pump pistons. The pressure waves from the mud pumps travel in the opposite direction from the uplink telemetry signal. Components of the noise waves from the surface mud pumps may be present in the frequency range used for transmission of the uplink telemetry signal and may even have a higher level than the received uplink signal, making correct detection of the received uplink signal very difficult. Additional sources of noise include the drilling motor and drill bit interaction with the formation. All these factors degrade the quality of the received uplink signal and make it difficult to recover the transmitted information.

The prior art systems attempt to find a successful solution that would eliminate a substantial portion or all of the mud pump noise measured by transducers at the surface and, in so doing, improve reception of telemetry signals transmitted from downhole. Some of these systems also attempt to account for reflected waves traveling back in the direction of the source of the original waves. However, none provide means for substantially reducing mud pump noise while also dealing with distortion caused by the mud channel and reflected waves. The present disclosure addresses this difficulty with a simple solution.

SUMMARY OF THE DISCLOSURE

One embodiment of the disclosure is a method of communicating a signal through a fluid in a borehole between a first location and a second location. The method includes measuring signals in the fluid at at least two spaced apart positions in response to simultaneous operation of: (A) at least one noise source, and (B) a message source, estimating from the signals in the fluid at the at least two spaced apart positions at least a subset of a separation matrix; and using the estimated separation matrix and the signals at the at least two spaced apart locations to estimate a signal sent by the message source.

Another embodiment is a system for communicating a signal through a fluid in a borehole between a bottomhole assembly (BHA) and a surface location. The system includes a message source on the bottomhole assembly (BHA) configured to generate a message signal; sensors at at least two spaced apart positions configured to measure signals in response to simultaneous operation of a noise source and the message source, and at least one processor configured to estimate from the signals in the fluid at the at least two spaced apart positions at least a subset of a separation matrix; and use the estimated separation matrix and the signals at the at least two spaced apart locations to estimate a message signal sent by the message source.

Another embodiment is a computer-readable medium for use with a system for communicating a signal through a fluid in a borehole between a bottomhole assembly (BHA) and a surface location. The system includes a message source on the bottomhole assembly (BHA) configured to generate a message signal, and sensors at at least two spaced apart positions configured to measure signals in response to simultaneous operation of a noise source and the message source. The medium includes instructions that enable at least one processor to estimate from the signals in the fluid at the at least two spaced apart positions a separation matrix, and use the separation matrix and the signals at the at least two spaced apart locations to estimate the message signal.

BRIEF DESCRIPTION OF THE DRAWINGS

For detailed understanding of the present disclosure, references should be made to the following detailed description of the preferred embodiment, taken in conjunction with the accompanying drawings, in which like elements have been given like numerals and wherein:

FIG. 2A is a schematic view of a pulser assembly for mud pulse telemetry;

FIG. 2B shows a stator of the pulser assembly of FIG. 2A;

FIG. 2C shows a rotor of the pulser assembly of FIG. 2A;

DETAILED DESCRIPTION OF THE DISCLOSURE

Figure 1:
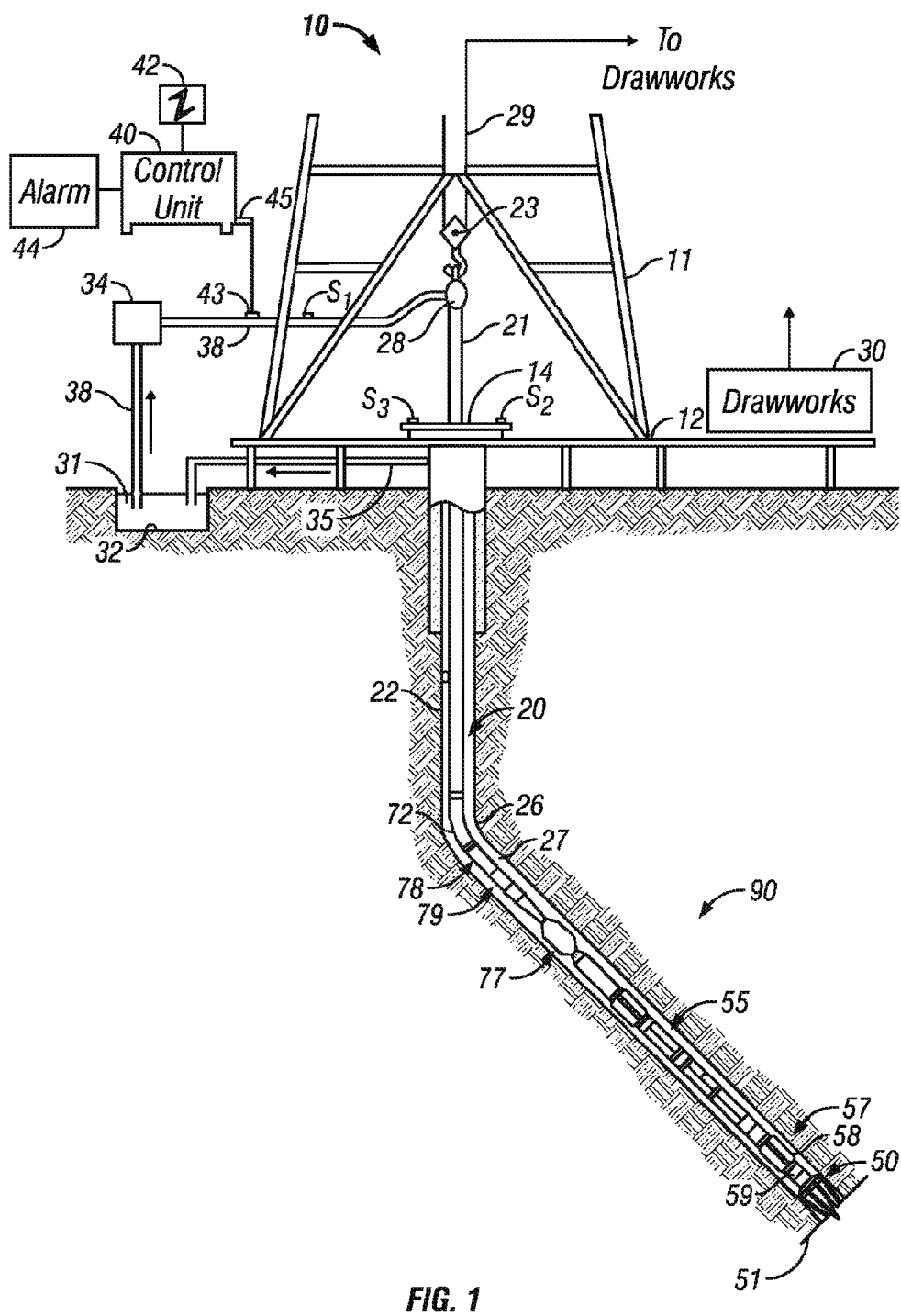
FIG. 1 shows a schematic diagram of a drilling system with a drillstring carrying a drilling assembly conveyed in a wellbore for drilling the wellbore.

FIG. 1 shows a schematic diagram of a drilling system 10 with a drillstring 20 carrying a drilling assembly 90 (also referred to as the bottomhole assembly, or "BHA") conveyed in a "wellbore" or "borehole" 26 for drilling the wellbore. The drilling system 10 includes a conventional derrick 11 erected on a floor 12 which supports a rotary table 14 that is rotated by a prime mover such as an electric motor (not shown) at a desired rotational speed. The drillstring 20 includes a tubing such as a drill pipe 22 or a coiled-tubing extending downward from the surface into the borehole 26. The drillstring 20 is pushed into the wellbore 26 when a drill pipe 22 is used as the tubing. For coiled-tubing applications, a tubing injector, such as an injector (not shown), however, is used to move the tubing from a source thereof, such as a reel (not shown), to the wellbore 26. The drill bit 50 attached to the end of the drillstring breaks up the geological formations when it is rotated to drill the borehole 26. If a drill pipe 22 is used, the drillstring 20 is coupled to a drawworks 30 via a Kelly joint 21, swivel 28, and line 29 through a pulley 23. During drilling operations, the drawworks 30 is operated to control the weight on bit, which is an important parameter that affects the rate of penetration. The operation of the drawworks is well known in the art and is thus not described in detail herein.

During drilling operations, a suitable drilling fluid 31 from a mud pit (source) 32 is circulated under pressure through a channel in the drillstring 20 by a mud pump 34. The drilling fluid passes from the mud pump 34 into the drillstring 20 via a desurger (not shown), fluid line 38 and Kelly joint 21. The drilling fluid 31 is discharged at the borehole bottom 51 through an opening in the drill bit 50. The drilling fluid 31 circulates uphole through the annular space 27 between the drillstring 20 and the borehole 26 and returns to the mud pit 32 via a return line 35. The drilling fluid acts to lubricate the drill bit 50 and to carry borehole cutting or chips away from the drill bit 50. A sensor $S_1$ typically placed in the line 38 provides information about the fluid flow rate. A surface torque sensor $S_2$ and a sensor $S_3$ associated with the drillstring 20 respectively provide information about the torque and rotational speed of the drillstring. Additionally, a sensor (not shown) associated with line 29 is used to provide the hook load of the drillstring 20.

In one embodiment of the disclosure, the drill bit 50 is rotated by only rotating the drill pipe 22. In another embodiment of the disclosure, a downhole motor 55 (mud motor) is disposed in the drilling assembly 90 to rotate the drill bit 50 and the drill pipe 22 is rotated usually to supplement the rotational power, if required, and to effect changes in the drilling direction.

In an exemplary embodiment of FIG. 1, the mud motor 55 is coupled to the drill bit 50 via a drive shaft (not shown) disposed in a bearing assembly 57. The mud motor rotates the drill bit 50 when the drilling fluid 31 passes through the mud motor 55 under pressure. The bearing assembly 57 supports the radial and axial forces of the drill bit. A stabilizer 58 coupled to the bearing assembly 57 acts as a centralizer for the lowermost portion of the mud motor assembly.

In one embodiment of the disclosure, a drilling sensor module 59 is placed near the drill bit 50. The drilling sensor module contains sensors, circuitry and processing software and algorithms relating to the dynamic drilling parameters. Such parameters typically include bit bounce, stick-slip of the drilling assembly, backward rotation, torque, shocks, borehole and annulus pressure, acceleration measurements and other measurements of the drill bit condition. A suitable telemetry or communication sub 72 using, for example, two-way telemetry, is also provided as illustrated in the drilling assembly 90. The drilling sensor module processes the sensor information and transmits it to the surface control unit 40 via the telemetry system 72.

The communication sub 72, a power unit 78 and an MWD tool 79 are all connected in tandem with the drillstring 20. Flex subs, for example, are used in connecting the MWD tool 79 in the drilling assembly 90. Such subs and tools form the bottom hole drilling assembly 90 between the drillstring 20 and the drill bit 50. The drilling assembly 90 makes various measurements including the pulsed nuclear magnetic resonance measurements while the borehole 26 is being drilled. The communication sub 72 obtains the signals and measurements and transfers the signals, using two-way telemetry, for example, to be processed on the surface. Alternatively, the signals can be processed using a downhole processor in the drilling assembly 90.

The surface control unit or processor 40 also receives signals from other downhole sensors and devices and signals from sensors $S_1$-$S_3$ and other sensors used in the system 10 and processes such signals according to programmed instructions provided to the surface control unit 40. The surface control unit 40 displays desired drilling parameters and other information on a display/monitor 42 utilized by an operator to control the drilling operations. The surface control unit 40 typically includes a computer or a microprocessor-based processing system, memory for storing programs or models and data, a recorder for recording data, and other peripherals. The control unit 40 is typically adapted to activate alarms 44 when certain unsafe or undesirable operating conditions occur. The system also includes a downhole processor, sensor assembly for making formation evaluation and an orientation sensor. These may be located at any suitable position on the bottomhole assembly (BHA). A point of novelty of the system is a surface processor that is configured to processes up-linked telemetry signals and provide an estimate of the telemetry signal.

FIG. 2A is a schematic view of the pulser, also called an oscillating shear valve, assembly 19, for mud pulse telemetry. The pulser assembly 19 is located in the inner bore of the tool housing 101. The housing 101 may be a bored drill collar in the bottom hole assembly 10, or, alternatively, a separate housing adapted to fit into a drill collar bore. The drilling fluid 31 flows through the stator 102 and rotor 103 and passes through the annulus between the pulser housing 108 and the inner diameter of the tool housing 101.

The stator 102, see FIGS. 2A and 2B, is fixed with respect to the tool housing 101 and to the pulser housing 108 and has multiple lengthwise flow passages 120. The rotor 103, see FIGS. 2A and 2C, is disk shaped with notched blades 130 creating flow passages 125 similar in size and shape to the flow passages 120 in the stator 102. Alternatively, the flow passages 120 and 125 may be holes through the stator 102 and the rotor 103, respectively. The rotor passages 125 are adapted such that they can be aligned, at one angular position with the stator passages 120 to create a straight through flow path. The rotor 103 is positioned in close proximity to the stator 102 and is adapted to rotationally oscillate. An angular displacement of the rotor 103 with respect to the stator 102 changes the effective flow area creating pressure fluctuations in the circulated mud column. To achieve one pressure cycle it is necessary to open and close the flow channel by changing the angular positioning of the rotor blades 130 with respect to the stator flow passage 120. This can be done with an oscillating movement of the rotor 103. Rotor blades 130 are rotated in a first direction until the flow area is fully or partly restricted. This creates a pressure increase. They are then rotated in the opposite direction to open the flow path again. This creates a pressure decrease. The required angular displacement depends on the design of the rotor 103 and stator 102. The more flow paths the rotor 103 incorporates, the less the angular displacement required to create a pressure fluctuation is. A small actuation angle to create the pressure drop is desirable. The power required to accelerate the rotor 103 is proportional to the angular displacement. The lower the angular displacement is, the lower the required actuation power to accelerate or decelerate the rotor 103 is. As an example, with eight flow openings on the rotor 103 and on the stator 102, an angular displacement of approximately 22.5° is used to create the pressure drop. This keeps the actuation energy relatively small at high pulse frequencies. Note that it is not necessary to completely block the flow to create a pressure pulse and therefore different amounts of blockage, or angular rotation, create different pulse amplitudes.

The rotor 103 is attached to shaft 106. Shaft 106 passes through a flexible bellows 107 and fits through bearings 109 which fix the shaft in radial and axial location with respect to housing 108. The shaft is connected to a electrical motor 104, which may be a reversible brushless DC motor, a servomotor, or a stepper motor. The motor 104 is electronically controlled, by circuitry in the electronics module 135, to allow the rotor 103 to be precisely driven in either direction. The precise control of the rotor 103 position provides for specific shaping of the generated pressure pulse. Such motors are commercially available and are not discussed further. The electronics module 135 may contain a programmable processor which can be preprogrammed to transmit data utilizing any of a number of encoding schemes which include, but are not limited to, Amplitude Shift Keying (ASK), Frequency Shift Keying (FSK), or Phase Shift Keying (PSK) or the combination of these techniques.

In one embodiment of the disclosure, the tool housing 101 has pressure sensors, not shown, mounted in locations above and below the pulser assembly, with the sensing surface exposed to the fluid in the drill string bore. These sensors are powered by the electronics module 135 and can be for receiving surface transmitted pressure pulses. The processor in the electronics module 135 may be programmed to alter the data encoding parameters based on surface transmitted pulses. The encoding parameters can include type of encoding scheme, baseline pulse amplitude, baseline frequency, or other parameters affecting the encoding of data.

The entire pulser housing 108 is filled with appropriate lubricant 111 to lubricate the bearings 109 and to pressure compensate the internal pulser housing 108 pressure with the downhole pressure of the drilling mud 31. The bearings 109 are typical anti-friction bearings known in the art and are not described further. In one embodiment, the seal 107 is a flexible bellows seal directly coupled to the shaft 106 and the pulser housing 108 and hermetically seals the oil filled pulser housing 108. The angular movement of the shaft 106 causes the flexible material of the bellows seal 107 to twist thereby accommodating the angular motion. The flexible bellows material may be an elastomeric material or, alternatively, a fiber reinforced elastomeric material. It is necessary to keep the angular rotation relatively small so that the bellows material will not be overstressed by the twisting motion. In an alternate preferred embodiment, the seal 107 may be an elastomeric rotating shaft seal or a mechanical face seal.

In one embodiment, the motor 104 is adapted with a double ended shaft or alternatively a hollow shaft. One end of the motor shaft is attached to shaft 106 and the other end of the motor shaft is attached to torsion spring 105. The other end of torsion spring 105 is anchored to end cap 115. The torsion spring 105 along with the shaft 106 and the rotor 103 comprise a mechanical spring-mass system. The torsion spring 105 is designed such that this spring-mass system is at its natural frequency at, or near, the desired oscillating pulse frequency of the pulser. The methodology for designing a resonant torsion spring-mass system is well known in the mechanical arts and is not described here. The advantage of a resonant system is that once the system is at resonance, the motor only has to provide power to overcome external forces and system dampening, while the rotational inertia forces are balanced out by the resonating system.

Figure 3:
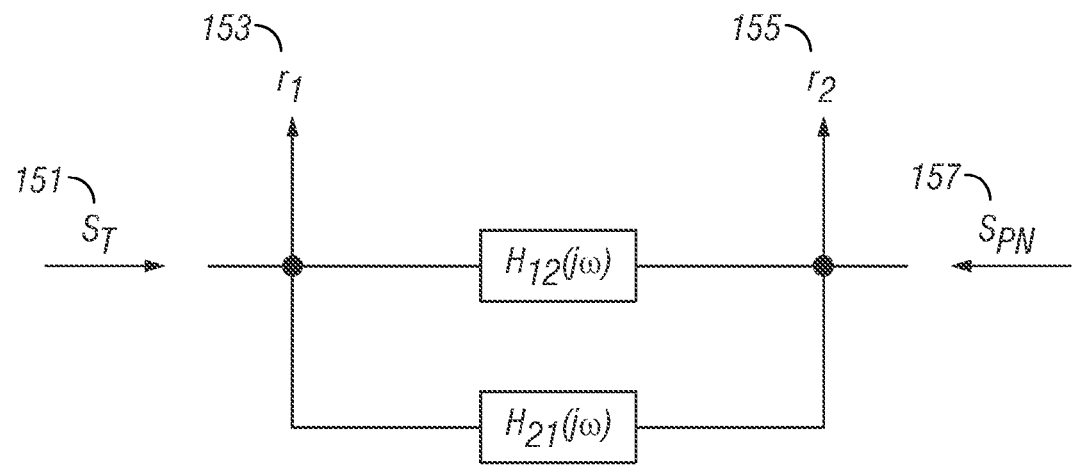
FIG. 3 shows a block diagram showing a single transfer system providing channels for the propagation of signals.

FIG. 3 shows a block diagram showing a single transfer system providing channels for the propagation of signals. The telemetry (message) signal $S_T$ 151 and the pump noise $S_{PN}$ 157 are shown. The signals are detected by at least two sensors $r_1$ and $r_2$ (153, 155 respectively). The mixture of the telemetry signal $S_T$ and pump noise $S_{PN}$, both signal waves traveling in opposite directions through the system with the transfer functions $H_{12}(j\omega)$ and $H_{21}(j\omega)$ for each direction, are measured by two sensors as $$r_1(t) = S_T + F^{-1}(H_{12}(j\omega)) * S_{PN}$$

$$r_2(t) = S_{PN} + F^{-1}(H_{21}(j\omega)) * S_T \quad (1)$$

where $F^{-1}$ is the inverse Fourier transform and $\otimes$ is the convolution operator. U.S. patent application Ser. No. 11/311,196 of Reckmann et al, having the same assignee as the present application and the contents of which are incorporated herein by reference uses the formulation of eqn. (1) to estimate the channel transfer functions and estimate the telemetry signal.

Figure 4:
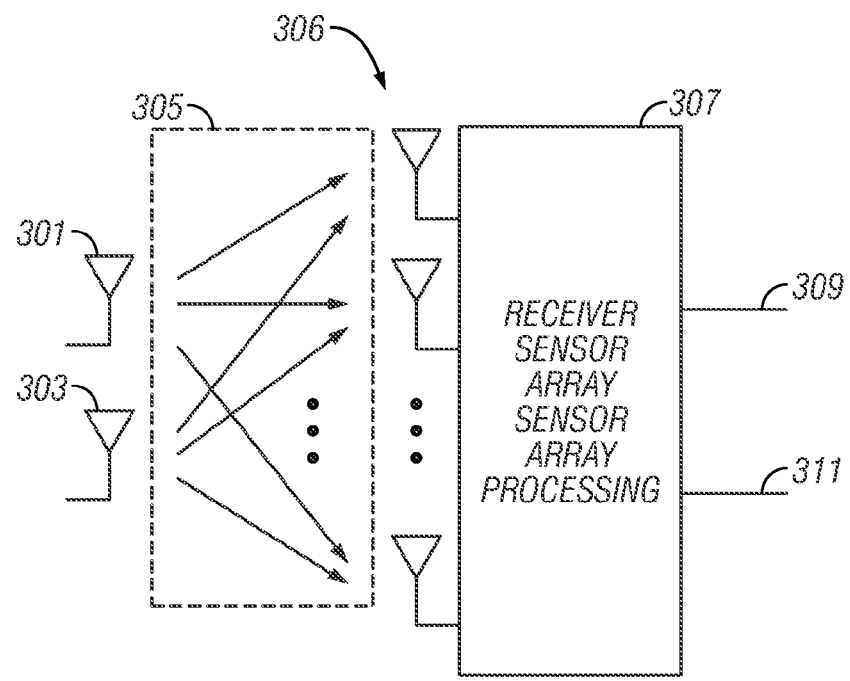
FIG. 4 shows a block diagram showing multiple transfer systems for the propagation of signals.

FIG. 4 shows a block diagram showing multiple transfer systems connected for the propagation of signals $s_T$ and $s_{PN}$. The telemetry (message) signal $s_T$ 301 and the pump noise $s_{PN}$ 303 are shown. A plurality of receivers 306 receive signals resulting from the telemetry signal 301 and the pump noise (signal) 303. When using n sensors for pressure measurements (n>1) the system is described as in Eq. (2):

$$r_1(t) = h_{11}(t) \otimes s_T(t) + h_{12}(t) \otimes s_{PN}(t) + n_1(t) \quad (2)$$
$$\vdots \quad \vdots \quad \vdots$$
$$r_m(t) = h_{m1}(t) \otimes s_T(t) + h_{m2}(t) \otimes s_{PN}(t) + n_m(t)$$

where $n_i(t)$ is a noise term. This can be rewritten in matrix form neglecting the noise term as $$\vec{r}(t) = \begin{pmatrix} r_1(t) \\ \vdots \\ r_n(t) \end{pmatrix} = \underbrace{\begin{pmatrix} h_{11}(t) & h_{12}(t) \\ \vdots & \vdots \\ h_{n1}(t) & h_{n2}(t) \end{pmatrix}}_{H(t)} \otimes \underbrace{\begin{pmatrix} s_T(t) \\ s_{PN}(t) \end{pmatrix}}_{\vec{s}(t)}; \quad (3)$$

$$\vec{r}(t) = H(t) \otimes \vec{s}(t)$$

The received n signals are represented by $\vec{r}(t)$ and are a convolutional mixture of the telemetric signal $s_T(t)$ and the signal $s_{PN}(t)$ generated at the pumps. The noise term is ignored to simplify the mathematics, but is not to be construed as a limitation. The mixing process is described by the channel matrix H(t), wherein $\otimes$ is the convolution operator. For the i-th sensor, $$r_i(t) = (h_{i1}(t) \quad h_{i2}(t)) \otimes \begin{pmatrix} s_T(t) \\ s_{PN}(t) \end{pmatrix}. \quad (4)$$

The telemetric signal $s_T(t)$ is obtained by separating it from the pump signal $s_{PN}(t)$. The processing system 307 processes the measurements $r_i(t)$ to give estimates $\hat{s}_T$ 309 of the telemetry signal and $\hat{s}_{PN}$ 311 pump noise. We may refer to $h_{i1}(t)$ and $h_{i2}(t)$ as a first transfer function between the receiver location and the message source and noise source respectively. Thus, when there are a plurality of receivers, we have first and second sets of transfer functions between the receiver locations and the message source and the noise source respectively.

Separation is done by convolution with a separation matrix W(t). This matrix can be understood as the inverse (two sensors) or generalized inverse (more than two sensors) of the mixing matrix H(t).

$$\vec{s}(t) \approx W(t) \otimes \vec{r}(t); \quad W(t) \otimes H(t) \approx \begin{pmatrix} \delta(t) & 0 \\ 0 & \delta(t) \end{pmatrix} \quad (4a)$$

For two sensors W(t) equals $$W(t) = \begin{pmatrix} h_{11}(t) \otimes h_{22}(t) - \\ h_{12}(t) \otimes h_{21}(t) \end{pmatrix}^{-1} \otimes \begin{pmatrix} h_{22}(t) & -h_{12}(t) \\ -h_{21}(t) & h_{11}(t) \end{pmatrix} \quad (4b)$$

$$= \begin{pmatrix} w_{11}(t) & w_{12}(t) \\ w_{21}(t) & w_{22}(t) \end{pmatrix}$$

For more than two sensors W(t) is given by equation (5), which is the least square solution for an over-determined equation system.

$$W(t) = (H^T(t) \otimes H(t))^{-1} \otimes H^T(t) = \begin{pmatrix} w_{11}(t) & \ldots & w_{1n}(t) \\ w_{21}(t) & \ldots & w_{2n}(t) \end{pmatrix} \quad (5)$$

To separate the signals two approaches are possible. The matrix W(t) can be estimated immediately (direct approach) or from an estimate of the channel matrix H(t) (indirect approach). For estimation we can use any algorithm known in the art (e.g. LMS, RLS, Zero forcing) to perform this task.

Figure 5:
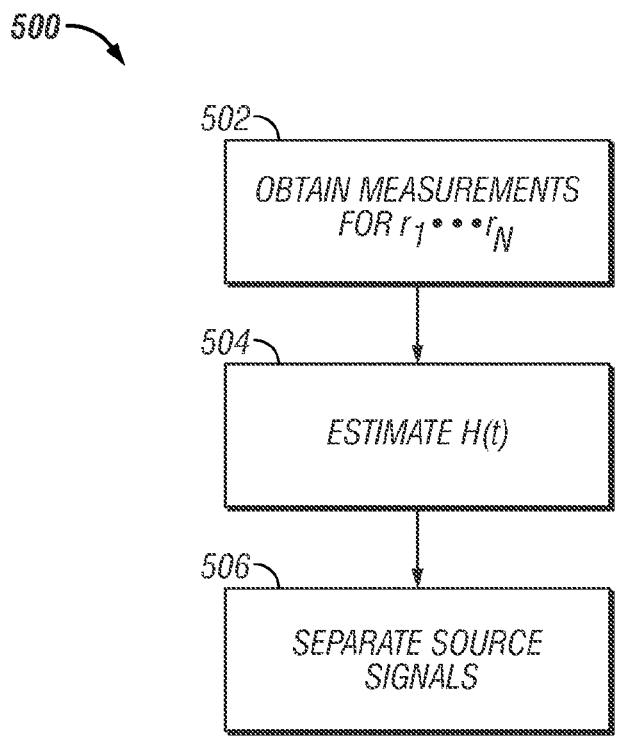
FIG. 5 shows a flowchart of an exemplary (indirect) method for separating two signals propagating in opposite directions using multiple sensors.

FIG. 5 shows a flowchart of an exemplary (indirect) method for separating two signals, such as $s_T$ and $s_{PN}$, using signals from multiple sensors. In Box 502, measurements $r_1$, $r_2$, ..., $r_N$ are obtained at the n sensors. In Box 504, a complete channel matrix $\tilde{H}(t)$ is estimated, wherein $\tilde{H}(t)$ is the estimate of the channel matrix H(t). Thus, the impulse responses of the 2n channels ($h_{12}$, $h_{21}$, $h_{23}$, $h_{32}$, ..., $h_{N-1,N}$, $h_{N,N-1}$) are estimated. We estimate and apply W(t) as given by eqns. (4a, 4b and 5). In 506, we separate the source signals.

In order to remove the pump signal from $\vec{s}(t)$ so that $s_T$ remains, it is sufficient to estimate the pump noise channels $h_{x2}(t)$ of the channel matrix only (e.g., the second column of H(t) in Eq. (3)). In this manner, it is possible to remove the pump signal $s_{PN}$, but then the remaining telemetry signal $s_T$ is distorted. Estimating and/or applying an equalizer may be used to recover the original telemetric signal. An exemplary equalizer for the two sensor application is $(\tilde{h}_{11}(t) \otimes \tilde{h}_{22}(t) - \tilde{h}_{12}(t) \otimes \tilde{h}_{21}(t))^{-1}$ (see Eq. (4b)). It should be noted that estimation of the first row of W(t) is sufficient to retrieve $s_T(t)$, and the use of the equalizer is for exemplary purposes only. Thus, it is sufficient to estimate a subset of the separation matrix.

In another aspect, instead of estimating all the channels or elements of W(t) for each source, one can, for instance, choose a function to represent a single matrix system element per source and then estimate the other ones of that source relative to the selected single system. Mathematically this is known as substitution. In the previous example using two channels, it can be chosen that $h_{12}(t)$ or $h_{22}(t)$ be a(t) in order to obtain estimates of the remaining channel. In a particular example, a(t) may be chosen as the dirac delta function $\delta(t)$. With this assumption Eq. (3) changes to either $$\vec{r}(t) = \begin{pmatrix} r_1(t) \\ r_2(t) \end{pmatrix} = \begin{pmatrix} h_{11}(t) & a(t) \\ h_{21}(t) & \hat{h}_{22}(t) \end{pmatrix} \otimes \begin{pmatrix} s_T(t) \\ \hat{s}_{PN}(t) \end{pmatrix} \quad (9a)$$

or $$\vec{r}(t) = \begin{pmatrix} r_1(t) \\ r_2(t) \end{pmatrix} = \begin{pmatrix} h_{11}(t) & \hat{h}_{12}(t) \\ h_{21}(t) & a(t) \end{pmatrix} \otimes \begin{pmatrix} s_T(t) \\ \hat{s}_{PN}(t) \end{pmatrix} \quad (9b)$$

where $\hat{h}_{22}(t)$ and $\hat{h}_{12}(t)$ are the derived transfer functions equivalent to $h_{22}(t)$ and $h_{12}(t)$, respectively. $\hat{s}_{PN}(t)$ is a virtually emitted pump signal and has identical effects on the system as $s_{PN}(t)$. $\hat{h}_{22}(t)$ and $\hat{h}_{12}(t)$ can be implemented as FIR filter or IIR filter as depicted in FIG. 6 and FIG. 7.

Figure 6:
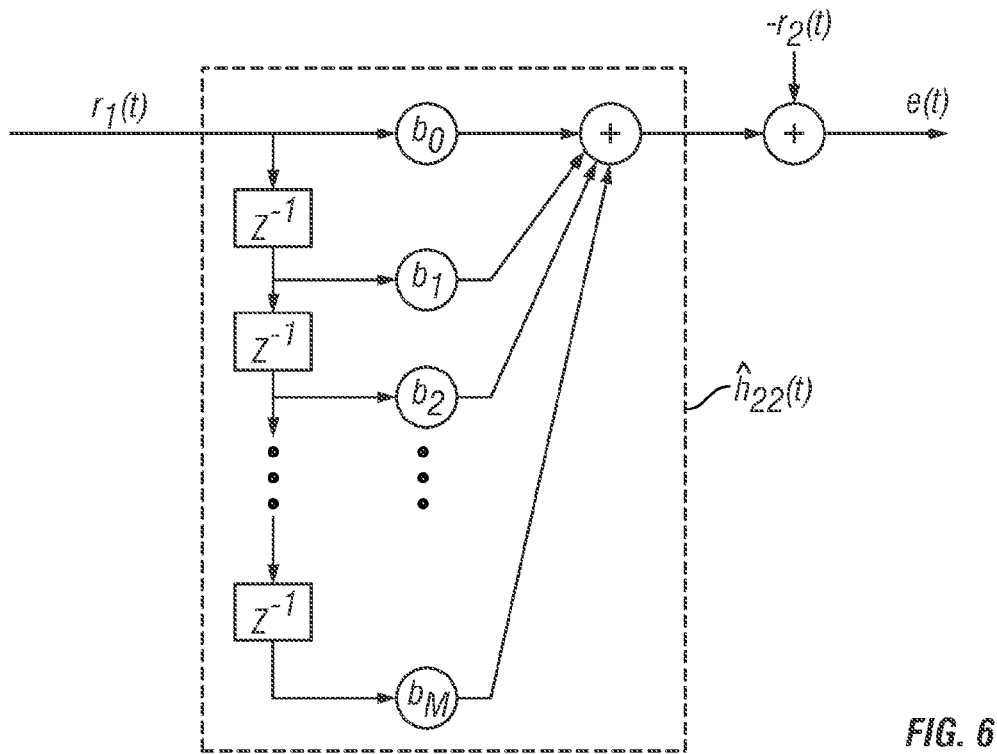
FIG. 6 shows an FIR implementation for an alternate (indirect) method for separating two signals propagating in opposite directions using multiple sensors.
Figure 7:
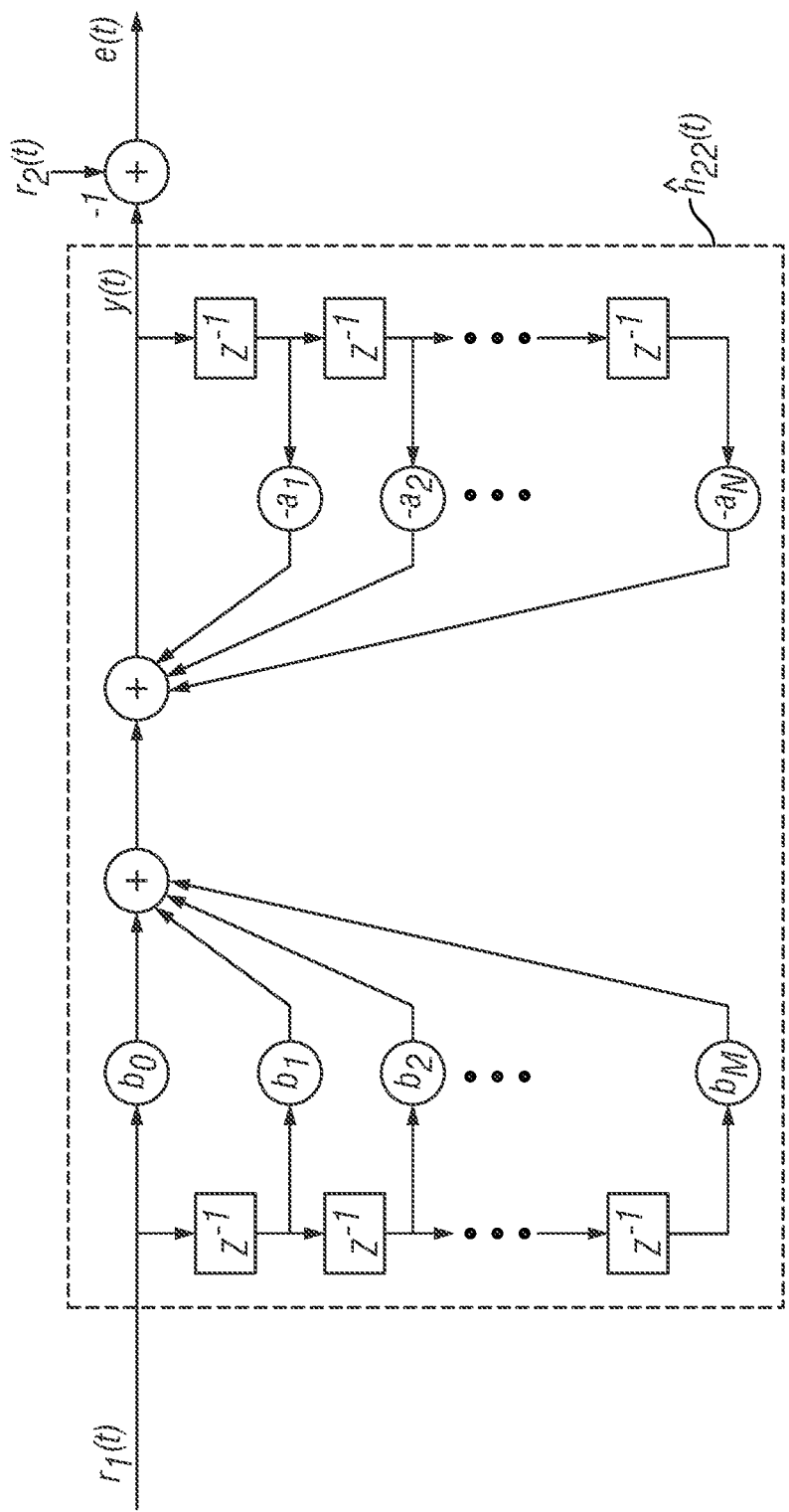
FIG. 7 shows an IIR implementation of an indirect method of separating signals.

The indirect approach is illustrated in an FIR implementation in FIG. 6, including filter delays ($Z^{-1}$). For example we can minimize the expectation $e[e_2(t)]$ of the error signal $e(t) = r_1(t) * \hat{h}_{22}(t) - r_2(t)$.

This is a typical LMS or RLS approach. The filter $\hat{h}_{22}(t)$ is directly calculated minimizing the expectation $E[e^2(t)] = E[(r_1(t) \otimes \hat{h}_{22}(t) - r_2(t))^2]$ of the error signal $e(t)$ or the deterministic error function $$J = \sum_{t=1}^{K} (r_1(t) \otimes \hat{h}_{22}(t) - r_2(t))^2$$

towards the filter coefficients using the minimization procedure such as that described in *Proakis*, pages 321 to 309.

An IIR implementation is depicted in FIG. 7. As for the FIR implementation various algorithms with different error functions to minimize for the estimation of the IIR coefficients $b_k$ k=0, ..., M and $a_k$ k=1, ..., N exist, The proposed algorithm minimizes the output error variance $E[e^2(t)]$. It is described on pages 267 to 269 of *Regalia*.

For the description of the IIR filter estimation we introduce the coefficients vector $\vec{\Theta}(k)$.

$$\vec{\Theta}(k) = [b_0(k), b_1(k), b_2(k), \ldots, b_M(k), -a_1(k), -a_2(k), \ldots, -a_N(k)]^T$$

and the signal vector $$\vec{\Phi}(k) = [r_1(k), r_1(k-1), r_1(k-2), \ldots, r_1(k-M), y(k-1), y(k-2), \ldots, y(k-N)]^T$$

The filter output $y(k)$ is:

$$y(k) = \vec{\Phi}^T(k) \vec{\Theta}(k)$$

Derivative of the filter output:

$$\delta y / \delta b_n = \delta_n^b(k) = r_1(k) - \sum_{i=1}^{N} a_i(k) \delta_n^b(k-i)$$

$$\delta y / \delta a_m = \delta_m^a(k) = -y(k) - \sum_{i=1}^{N} a_i(k) \delta_m^a(k-i)$$

$$\vec{\delta}(k) = \begin{bmatrix} \delta_o^b(k), \delta_1^b(k), \delta_2^b(k), \ldots, \\ \delta_M^b(k), \delta_1^a(k), \delta_2^a(k), \ldots, \delta_N^a(k) \end{bmatrix}^T$$

Update of the error signal:

$$e(k) = r_2(t) - y(t)$$

Update of the filter coefficients vector:

$$\vec{\Theta}(k+1) = \vec{\Theta}(k) + \mu \vec{\delta}(k) e(k)$$

Finally the new filter with its coefficients $\vec{\Theta}(k+1)$ needs to be tested for its stability.

In the direct approach, $W(t)$ is estimated directly. In general $W(t)$ is a matrix comprising of 2n systems ($w_{11}(t)$, $w_{21}(t)$, ..., $w_{1n}(t)$, $w_{2n}(t)$). Assuming each system being a FIR filter of length L, we can imagine $W(t)$ having three dimensions (2×n×L) as showed in equation (12).

$$W(t) = \begin{pmatrix} w_{11}^{(0)} & \ldots & w_{1n}^{(0)} \\ w_{21}^{(0)} & \ldots & w_{2n}^{(0)} \end{pmatrix} \quad \begin{pmatrix} w_{11}^{(L-1)} & \ldots & w_{1n}^{(L-1)} \\ & \ddots & w_{2n}^{(L-1)} \end{pmatrix} \quad (W^{(L-1)}) \quad (12)$$

$$= (W^{(0)})$$

$W^{(k)}$ is a 2×n matrix at time k and a sequence of L matrices $W^{(0)}$ to $W^{(L-1)}$ forms $W(t)$.

The output vector containing the separated signals can be written as $$\vec{s}(t) = \sum_{k=0}^{L-1} W^{(k)} \vec{r}(t-k). \quad (13)$$

To estimate the separation matrix $W(t)$ you can use for example a gradient algorithm, updating all the L matrices $W^{(k)}$ one by one as described in *Hyvärinen*, pages 363-365.

$$W^{(k)}(t+1) = W^{(k)}(t) + \Delta W^{(k)}(t); k=0, \ldots, L-1$$

$$\Delta W^{(k)}(t) = W^{(k)}(t) - \vec{g}(\vec{s}(t-L)) \vec{v}^H(t-k)$$

$\vec{v}^H(t)$ is the conjugate transpose of the reverse-filtered output of the already separated signal $\vec{s}(t)$ from the previous iterations.

$$\vec{v}(t) = \sum_{q=0}^{L-1} W^{(L-q)H}(t) \vec{s}(t-q) \quad (14)$$

$\vec{g}(\vec{s})$ is a nonlinear function. For supergaussian distributions of $s_{PN}(t)$ or $s_T(t)$ you may use for example $$g^+(x) = -2\tan h(x). \quad (15)$$

For subgaussian distributions a possible nonlinear function is $$g^-(x) = \tan h(x) - x. \quad (12).$$

To increase the performance of the inverse channel matrix estimation we might preprocess the measured signal vector in a way that the elements of $\vec{r}(t)$ have zero mean and they are white. White means that the elements are uncorrelated and have unit variance.

Decorrelation of a zero mean signal can be achieved for example by Principal Component Analysis (PCA), described in [3] pages 140-141. PCA is a linear transform of a signal $\vec{x} = (x_0, \ldots, x_{l-1})^T$ with a matrix $$V = D^{-1/2} E^T \quad (13)$$

The columns of the matrix $E = (\vec{e}_0, \ldots, \vec{e}_{l-1})$ are the eigenvectors of the covariance matrix $C_x = E[\vec{x} \vec{x}^T]$ and $D = \text{diag}(d_0, \ldots, d_{-1})$ the diagonal matrix of the corresponding eigenvalues.

Based on the estimated telemetry signal, formation evaluation may be made substantially in real-time when the telemetry signal comprises measurements of formation evaluation sensors. In addition, drilling decisions may be made based on the telemetered signals.

The operation of the transmitter and receivers may be controlled by the downhole processor and/or the surface processor. Implicit in the control and processing of the data is the use of a computer program on a suitable machine readable medium that enables the processor to perform the control and processing. The machine readable medium may include ROMs, EPROMs, EAROMs, Flash Memories and Optical disks. The results of the processing include telemetry signal estimates relating to measurements made by downhole formation evaluation sensors. Such results are commonly stored on a suitable medium and may be used for further actions in reservoir development such as the completion of wells and the drilling of additional wells.

The foregoing description is directed to particular embodiments of the present disclosure for the purpose of illustration and explanation. It will be apparent, however, to one skilled in the art that many modifications and changes to the embodiment set forth above are possible without departing from the scope of the disclosure.

What is claimed is:

1. A method of communicating through a fluid in a borehole, the method comprising:
    measuring at at least two spaced apart positions signals including a mixture of at least one message signal generated by at least one message source and at least one noise signal generated by at least one noise source in the fluid;
    estimating from the measured signals at least a subset of a separation matrix by modeling each measured signal of the measured signals as equal to a convolutional mixture of the at least one message signal and the at least one noise signal in an acoustic transfer system equation, the convolutional mixture represented as a channel matrix operating solely on a signal matrix representing each of the at least one message signal and the at least one noise signal, wherein the measured signals correspond to a period of simultaneous operation of the at least one noise source and the at least one message source; and
    using at least the estimated subset of the separation matrix to estimate the at least one message signal from the measured signals corresponding to the period of simultaneous operation of the at least one noise source and the at least one message source;
    wherein the estimating of at least the subset of the separation matrix further comprises:
        estimating from the signals at the at least two spaced apart positions first transfer functions of a fluid channel between the at least two spaced apart positions and each of the at least one message source, and second transfer functions between the at least two spaced apart positions and the at least one noise source; and
        using inversion of the first and second transfer functions for estimating the subset of the separation matrix.

2. The method of claim 1 wherein the subset of the separation matrix comprises only a single row of the separation matrix.

3. The method of claim 1 wherein using at least the subset of the separation matrix further comprises using a filter that is one of: (i) a finite impulse response filter, and (ii) an infinite impulse response filter.

4. The method of claim 1 wherein the separation matrix is estimated directly from the signals at the at least two spaced apart positions, the method further comprising using a gradient algorithm.

5. The method of claim 1, wherein the subset of the separation matrix is configured to reduce noise and distortion associated with the message sent by each of the at least one message source.

6. The method of claim 1 wherein the estimating of at least a subset of the separation matrix comprises solving the acoustic transfer system equation with only the measured signals as input.

7. The method of claim 1 wherein the subset of the separation matrix comprises only a single row of the separation matrix.

8. The method of claim 1 wherein using at least the subset of the separation matrix further comprises using a filter that is one of: (i) a finite impulse response filter, and (ii) an infinite impulse response filter.

9. A system for communicating a signal through a fluid in a borehole between a bottomhole assembly (BHA) and a surface location, the system comprising:
    at least one message source on the bottomhole assembly (BHA) each configured to generate a message signal;
    sensors at at least two spaced apart positions configured to measure signals including a mixture of at least one message signal generated by the at least one message source and at least one noise signal generated by at least one noise source in the fluid at the at least two spaced apart positions; and
    at least one processor configured to:
        estimate from the measured signals at least a subset of a separation matrix by modeling each measured signal of the measured signals as equal to a convolutional mixture of the at least one message signal and the at least one noise signal in an acoustic transfer system equation, the convolutional mixture represented as a channel matrix operating solely on a signal matrix representing each of the at least one message signal and the at least one noise signal, wherein the measured signals correspond to a period of simultaneous operation of the at least one noise source and the at least one message source; and
        use at least the estimated subset of the separation matrix to estimate the at least one message signal from the measured signals corresponding to the period of simultaneous operation of the at least one noise source and the at least one message source
        wherein the at least one processor is configured to estimate at least a subset of the separation matrix by:
            estimating from the signals at the at least two spaced apart positions first transfer functions of a fluid channel between the at least two spaced apart positions and each of the at least one message source, and second transfer functions between the at least two spaced apart positions and the at least one noise source; and
            using inversion of the first and second transfer functions for estimating the subset of the separation matrix.

10. The system of claim 9 wherein the subset of the separation matrix further comprises only a single row of the separation matrix.

11. The system of claim 9 wherein the at least one processor is further configured to use at least the estimated subset of the separation matrix by using a filter that is one of: (i) a finite impulse response filter, and (ii) an infinite impulse response filter.

12. The system of claim 9 wherein the at least one processor is further configured to use a gradient algorithm to estimate at least a subset of the separation matrix directly from the signals at the at least two spaced apart positions.

13. The system of claim 9 further comprising a drilling tubular configured to convey the BHA into the borehole.

14. The system of claim 9 wherein the message source comprises an oscillating valve.

15. A non-transitory computer-readable medium product for use with a system for communicating a signal through a fluid in a borehole between a bottomhole assembly (BHA) and a surface location, the system comprising:
  at least one message source on the bottomhole assembly (BHA) each configured to generate a message signal;
  sensors at at least two spaced apart positions configured to measure signals including a mixture of at least one message signal generated by the at least one message source and at least one noise signal generated by at least one noise source in the fluid at the at least two spaced apart positions;
  the non-transitory computer-readable medium product comprising instructions that enable at least one processor to:
    estimate from the measured signals at least a subset of a separation matrix by modeling each measured signal of the measured signals as equal to a convolutional mixture of the at least one message signal and the at least one noise signal in an acoustic transfer system equation, the convolutional mixture represented as a channel matrix operating solely on a signal matrix representing each of the at least one message signal and the at least one noise signal, wherein the measured signals correspond to a period of simultaneous operation of the at least one noise source and the at least one message source; and
    use at least the estimated subset of the separation matrix to estimate the at least one message signal from the measured signals corresponding to the period of simultaneous operation of the at least one noise source and the at least one message source
  wherein the at least one processor is configured to estimate at least a subset of the separation matrix by:
    estimating from the signals at the at least two spaced apart positions first transfer functions of a fluid channel between the at least two spaced apart positions and each of the at least one message source, and second transfer functions between the at least two spaced apart positions and the at least one noise source; and
    using inversion of the first and second transfer functions for estimating the subset of the separation matrix.

16. The non-transitory computer-readable medium product of claim 15 further comprises at least one of (i) a ROM, (ii) an EPROM, (iii) an EAROM, (iv) a Flash Memory, and, (v) an Optical disks.

17. A method of communicating through a fluid in a borehole, the method comprising:
  measuring at at least three spaced apart positions signals including a mixture of at least one message signal generated by at least one message source and at least one noise signal generated by at least one noise source in the fluid;
  estimating from the measured signals at least a subset of a separation matrix by modeling each measured signal of the measured signals as equal to a convolutional mixture of the at least one message signal and the at least one noise signal in an acoustic transfer system equation, the convolutional mixture represented as a channel matrix operating solely on a signal matrix representing each of the at least one message signal and the at least one noise signal, wherein the measured signals correspond to a period of simultaneous operation of the at least one noise source and the at least one message source; and
  using at least the estimated subset of the separation matrix to estimate the at least one message signal from the measured signals corresponding to the period of simultaneous operation of the at least one noise source and the at least one message source;
  wherein the estimating of at least the subset of the separation matrix further comprises:
    estimating from the signals at the at least three spaced apart positions first transfer functions of a fluid channel between the at least three spaced apart positions and each of the at least one message source, and second transfer functions between the at least three spaced apart positions and the at least one noise source; and
    obtaining a generalized inverse of a matrix comprising the first transfer functions and the second transfer functions.

* * * * *